United States Patent
Chang et al.

(10) Patent No.: US 7,600,931 B2
(45) Date of Patent: Oct. 13, 2009

(54) LENS CAP DEVICE

(75) Inventors: Fan-Chieh Chang, Hsinchu (TW); I-Ming Liu, Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 262 days.

(21) Appl. No.: 11/681,232

(22) Filed: Mar. 2, 2007

(65) Prior Publication Data
US 2007/0253706 A1 Nov. 1, 2007

(30) Foreign Application Priority Data
Apr. 28, 2006 (TW) .............................. 95115341 A

(51) Int. Cl.
*G03B 17/00* (2006.01)
(52) U.S. Cl. .......................... 396/448; 359/511; 353/97
(58) Field of Classification Search ................. 396/448, 396/535; 359/507, 511; 353/97
See application file for complete search history.

(56) References Cited

U.S. PATENT DOCUMENTS

| | | | |
|---|---|---|---|
| 5,051,765 A * | 9/1991 | Yoshizaki et al. ........... 396/349 |
| 5,625,852 A * | 4/1997 | Wada et al. .................. 396/349 |
| 6,034,726 A | 3/2000 | Hirota et al. | |
| 6,264,380 B1 * | 7/2001 | Omiya ........................ 396/448 |
| 6,398,426 B1 * | 6/2002 | Takanashi .................... 396/448 |
| 6,570,621 B2 * | 5/2003 | Bigler et al. ................ 348/372 |
| 6,926,453 B2 * | 8/2005 | Hisamatsu ................... 396/349 |
| 2006/0115249 A1 * | 6/2006 | Mochinushi et al. ........... 396/29 |

FOREIGN PATENT DOCUMENTS

| | | |
|---|---|---|
| JP | 11338007 | 12/1999 |
| TW | 570207 | 1/2004 |
| TW | M265656 | 5/2005 |

* cited by examiner

*Primary Examiner*—WB Perkey
*Assistant Examiner*—Noam Reisner
(74) *Attorney, Agent, or Firm*—Ming Chow; Sinorica, LLC

(57) ABSTRACT

A lens cap device having a cap protecting device, an actuating device, and a lens cap. The cap protecting device has a protecting cap with a lens exposure hole. The actuating device has a push element and an actuating element. The push element is slidably disposed on the cap protecting device. One end of the actuating element is pivotally connected on the cap protecting device to form a pivot point. The actuating element and the push element are linked together. The lens cap is slidably mounted on the cap protecting device. The lens cap is pivotally connected with the other end of the actuating element. The lens cap is driven by the actuating element to cover or open the lens exposure hole.

10 Claims, 6 Drawing Sheets

LENS CAP DEVICE

BACKGROUND OF THE INVENTION

1. Field of the Invention

The present invention relates to a lens cap device and, more particularly, to a lens cap device that incorporates a thin lens cap and uses an actuating device to control the fast slide motion of the cap lens, so as to facilitate lens protection.

2. Description of Related art

Projectors use projection lenses to project data image to external receptacles such as screens. Once the projection lenses are scratched or contaminated by dusts, the imaging quality of projectors is seriously affected. Therefore, the projector is typically equipped with a lens cap to protect the lens from being scratched or contaminated. The lens cap is externally attached to the projector and needs to be removed from the projector before switching on the projector. It is thus very easy to lose or misplace the lens cap, hence causing much trouble for users. Moreover, the projector is turned on before the lens cap is removed, the high temperature of the projection light causes the lens cap which is generally made of plastic to be melted and result in safety issue. In order to resolve the misplacement problem, the lens cap is typically connected to the enclosure of the projector by a string, which degrades the aesthetic effect of the projector without resolving the safety concern.

In another conventional design, the lens cap is attached to external side of a housing of the projector. The lens cap is slide or turned to open or close. In either way, the lens is exposed outside of the projector to affect the aesthetics of the projector.

In yet another conventional design proposed in Taiwanese Patent No. 512255, an electric lens cap is driven to open or close by gears and belts of a step motor controlled by electric power. This technique often suffers from inaccurate actuation because of mechanical jamming caused by dusts and the lens cap cannot be properly open or close. Further, the internal high temperature of the projector often dries up or cause leakage of lubricating oil, which also affects operation of the lens cap. Furthermore, the electrical approach is costly and inconvenient that the lens cap cannot be removed until the electric power turning on.

In consideration of the above drawbacks in operation and structure design of the prior art, a lens cap device is provided to provide more convenient operation and improved safety.

SUMMARY OF THE INVENTION

A lens cap device is provided to facilitate convenient opening and closing actions of the lens cap, stable and precise positioning, and allow the lens cap stored within the projector to avoid the problem of easily losing the lens cap.

The lens cap device as provided reconciles the opening and closing actions of the lens cap with the on and off conditions of the projector to enhance the operation safety of the projector.

The lens cap device allows the lens cap to be stored inside the projector so that a thinner structure is achieved to enhance the design quality of the projector, facilitate the assembly, convenience of assembly, and quality of image projection.

In one embodiment, the lens cap device comprises a cap protecting device, an actuating device and a lens cap. The cap protecting device includes a protecting cap with a lens exposure hole. The actuating device has a push element and an actuating element. The push element is slidably disposed on the cap protecting device. One end of the actuating element is pivotally connected to the cap protecting cap to form a pivot point. The actuating element and the push element are linked together. The lens cap is slidably mounted on the cap protecting device. The lens cap is pivotally connected with the other end of the actuating element. The lens cap is driven by the actuating element to cover or open the lens exposure hole.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
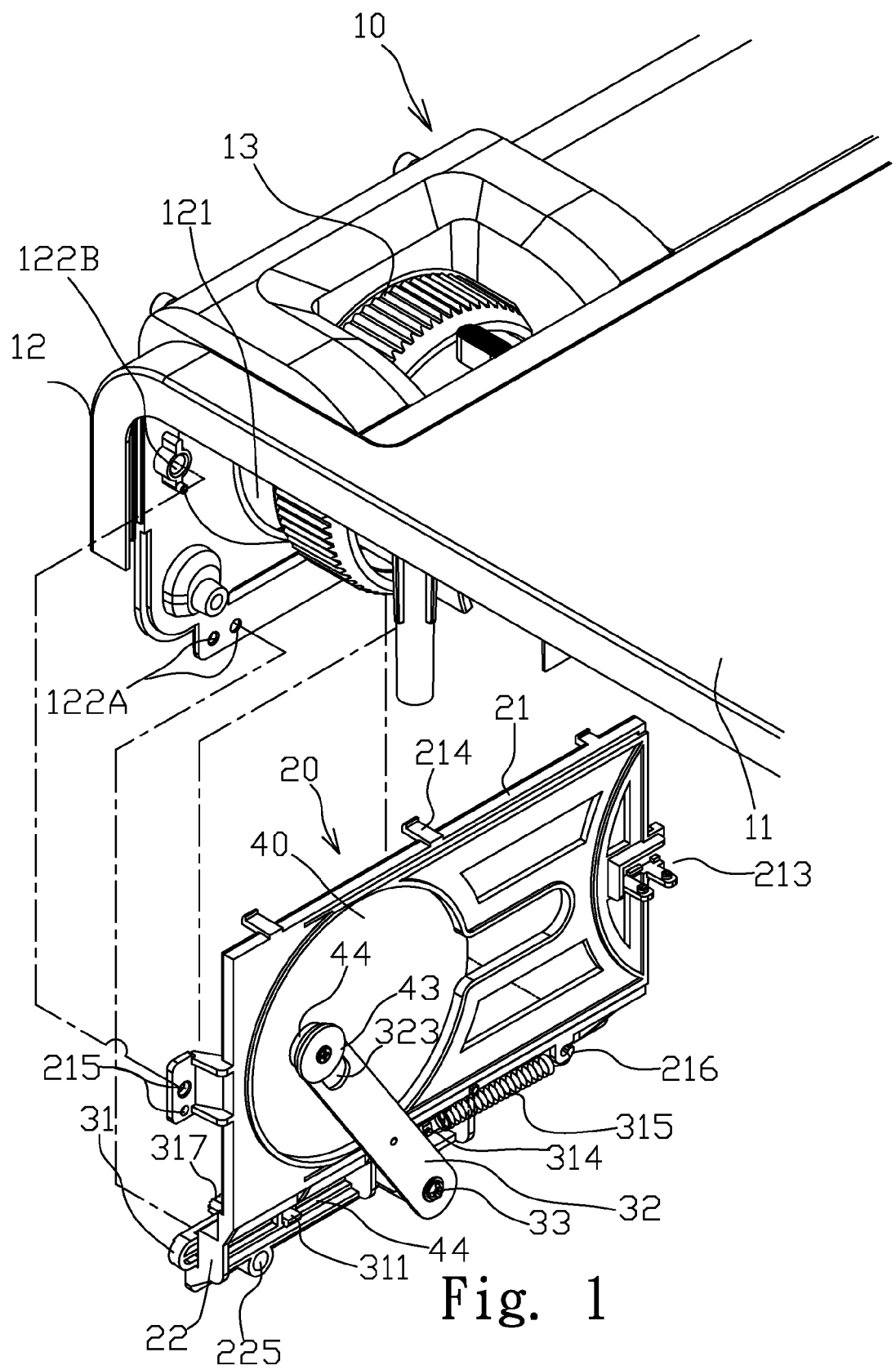
FIG. 1 is a partial exploded perspective diagram of the lens cap device according to the present invention.
Figure 2:
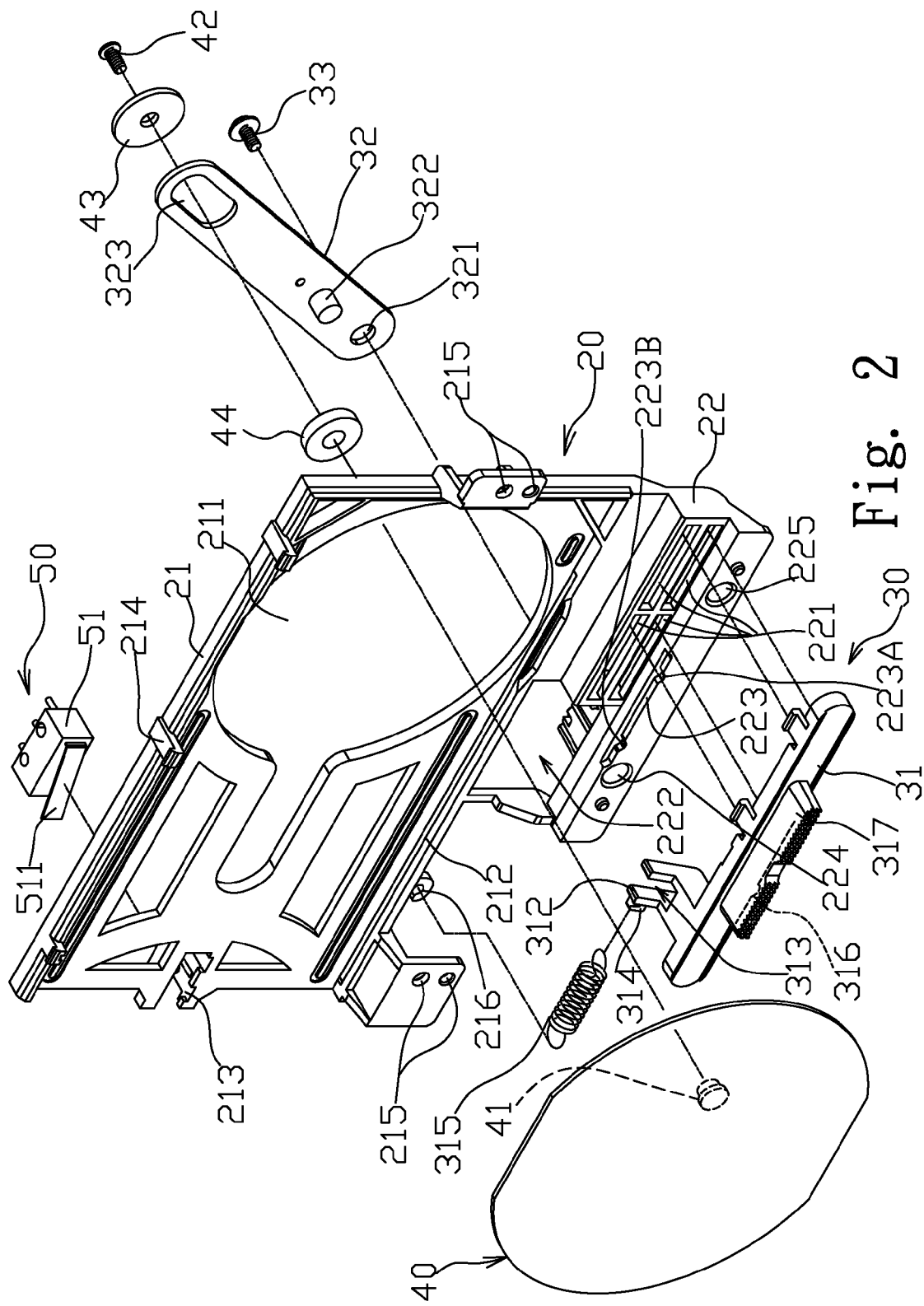
FIG. 2 is a perspective diagram of the cap protecting device according to the present invention.
Figure 3:
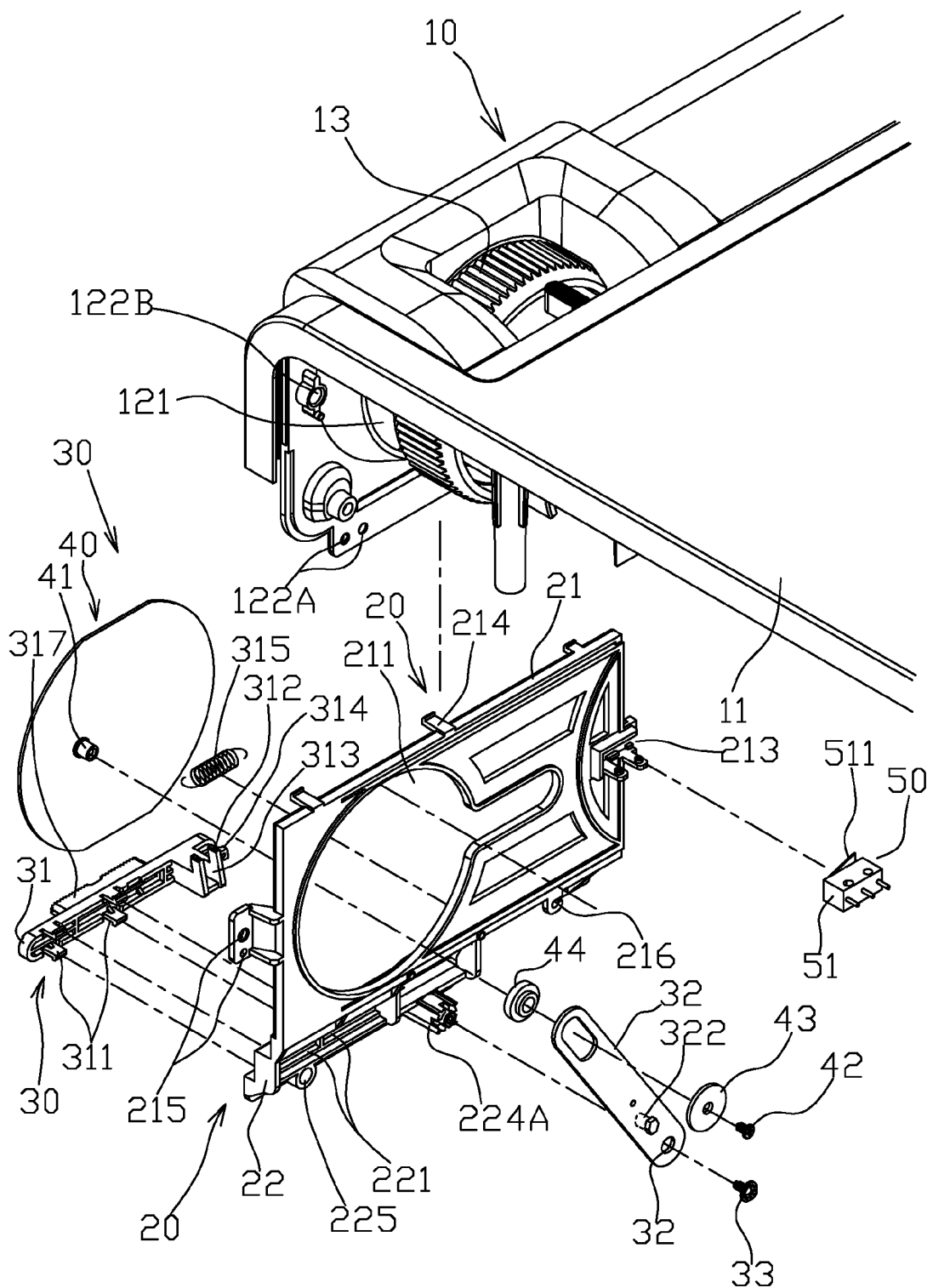
FIG. 3 is an exploded diagram of the lens cap device according to the present invention.

As shown in FIGS. 1, 2 and 3, a lens cap device comprises a body device 10, a cap protecting device 20, an actuating device 30, a lens cap 40 and a sensor 50. The body device 10 comprises a main body 11. The main body 11 includes a front sidewall 12 having a lens hole 121. The front sidewall 12 has a plurality of fitting holes 122A and 122B. A projection lens 13 is aligned with the lens hole 121 of the main body 11. The projection lens 13 inside the main body 11 is separated from the front sidewall 12 to form a predetermined space.

The cap protecting device 20 is installed on the main body 11 of the body device 10 within the space between the projection lens 13 and the front sidewall 12. The cap protecting device 20 comprises a protecting cap 21 and a protecting cap base 22. A lens exposure hole 211 is formed through the protecting cap 21 and aligned with the lens hole 121. A sliding slot 212 is formed through the protecting cap 21. The protecting cap 21 includes a positioning groove 213, a hook member 216, a plurality of locking hooks 214 and a fitting hole 215. The fitting hole 215 is firmly attached with the fitting hole 122B, while the locking hooks 214 is hooked to the main body 11 (not shown). The cap protecting base 22 is located at the bottom rim of the protecting cap 21 and has two locking grooves 221 in the embodiment. An opening portion 222 is formed adjacent to the locking groove 221. A sliding groove 223, a pivot positioning hole 224, a pivot positioning base 224A and a fitting hole 225 are formed under the locking groove 221. The sliding groove 223 has a front snap groove 223A and a rear snap groove 223B for snap positioning. The fitting hole 225 is firmly connected to the fitting hole 122A. The actuating device 30 comprises a push element 31 and an actuating element 32, and the push element 31 is connected to the actuating element 32. The push element 31 includes two protrusions 311 corresponding to the locking grooves 221. The protrusion 311 is inserted into and engaged with the locking groove 221 such that the push element positioned on the cap protecting base 22 is slidable in the locking groove 221. The push element 31 includes a push base 312 capable of linking the actuating element 32 corresponding to the open portion 222. A push groove 313 is formed at the push base 312. The push groove 313 is positioned at the center of the cap protecting device 20 and a hook loop 314 is formed at the push element 31. The hook loop 314 is operative to hook to one end of a spring 315, while the other end of the spring 315 is hooked to the hook member 216 of the protecting cap 21. A locking protrusion 316 is disposed at the bottom edge of the push element 31. The locking protrusion 316 is slidable in the sliding groove 223 to achieve snap positioning relative to the front snap groove 223A and the rear snap groove 223B before and after the motion of the actuating device 30. The push element 31 has a push member 317 corresponding to the other side (i.e., the outside) of the protecting cap 21. The push member 317 has an uneven (or streak) surface to facilitate pushing operation of the push member 317. The actuating element 32 is in the form of a plate member having a pivot hole 321, a push rod 322, and an elliptic pivotal groove 323. A bolt 33 is pivotally connected to the pivot hole 321 and the pivot positioning hole 224 to form a pivot to the actuating element 32 on the cap protecting device 20. The push rod 322 is closer to the pivot hole 321 than to the pivotal groove 323. The push rod 322 is embedded in the push groove 313 of the push element 31 to form a linkage between the actuating element 32 and the push element 31.

The lens cap 40 is in the form of a thin slab and is embedded in the lens exposure hole 211 of the protecting cap 21. The lens cap 40 is slidably disposed in the slot 212 formed on an inner surface of the protecting cap 21. The lens cap 40 has a screw post 41 allowing a bolt 42 engaged with the elliptic pivotal groove 323 on the other end of the actuating element 32 opposite to the pivot. Spacers 43 and 44 are preferably applied, and a linkage between the lens cap 40 and the actuating element 32 is formed. The lens cap 40 is driven by the actuating element 32 to cover or open the lens exposure hole 211.

The sensor 50 comprises a touch switch 51 mounted to the positioning groove 213 of the protecting cap 21 to sense the lens cap 40. The touch switch 51 has a touch plate 511. The touch switch 51 is connected to a power control device of a projector, and provides a control mechanism of the power switch of the projector. Before the lens cap 40 is open, the power system is cut off so that the projector cannot be switched on to ensure safety use. The sensor 50 can be an optical sensor, such as an IR sensor (not shown), and the optical sensor can be disposed at the exactly-opened position or the exactly-closed position of the lens cap 40 to detect whether the lens cap 40 is exactly opened or closed (similarly for the above contact switch 51). The power of the projector can be turned on for projection only when the lens cap 40 is exactly opened. The optical sensor integrated with alarm devices having sound and light effects to emit an alarm signal when the projector is not exactly turned off, thereby accomplishing the effect of safe operation.

Figure 4A:
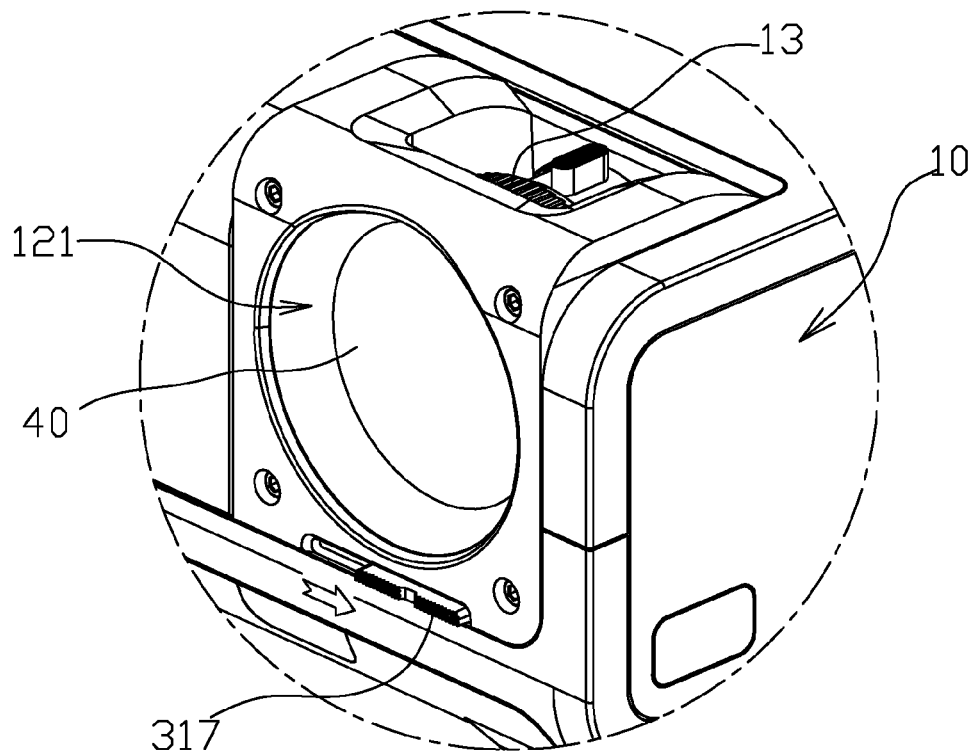
FIG. 4A is a perspective diagram showing the closing operation of the lens cap device according to the present invention.
Figure 4B:
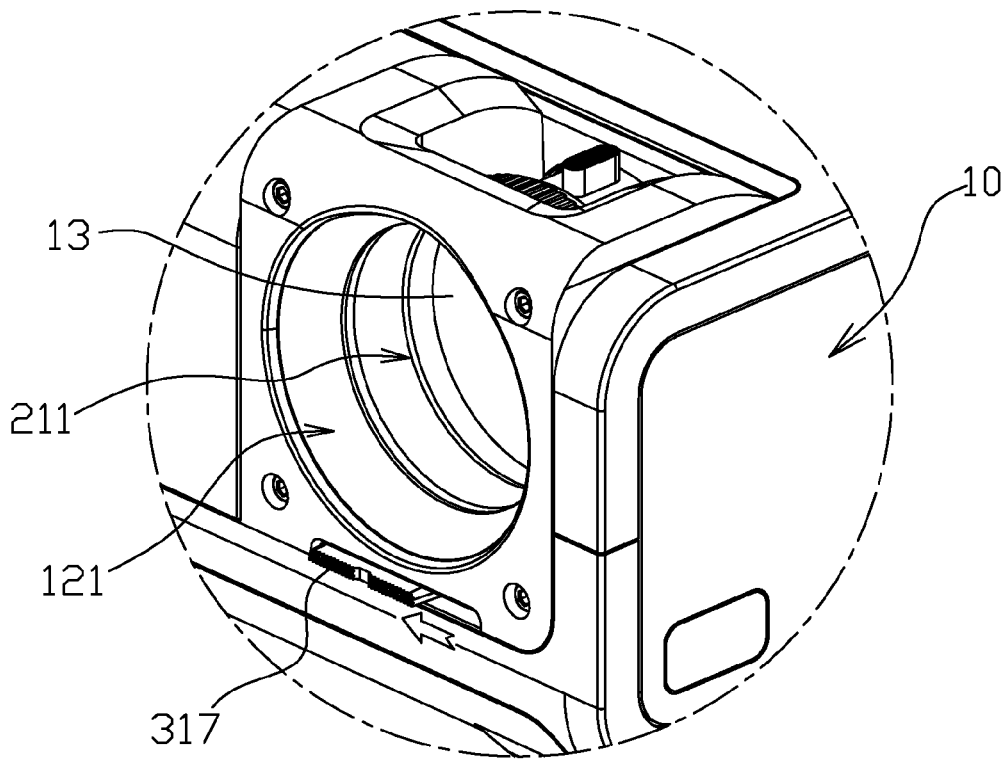
FIG. 4B is a perspective diagram showing the opening operation of the lens cap device according to the present invention.
Figure 5A:
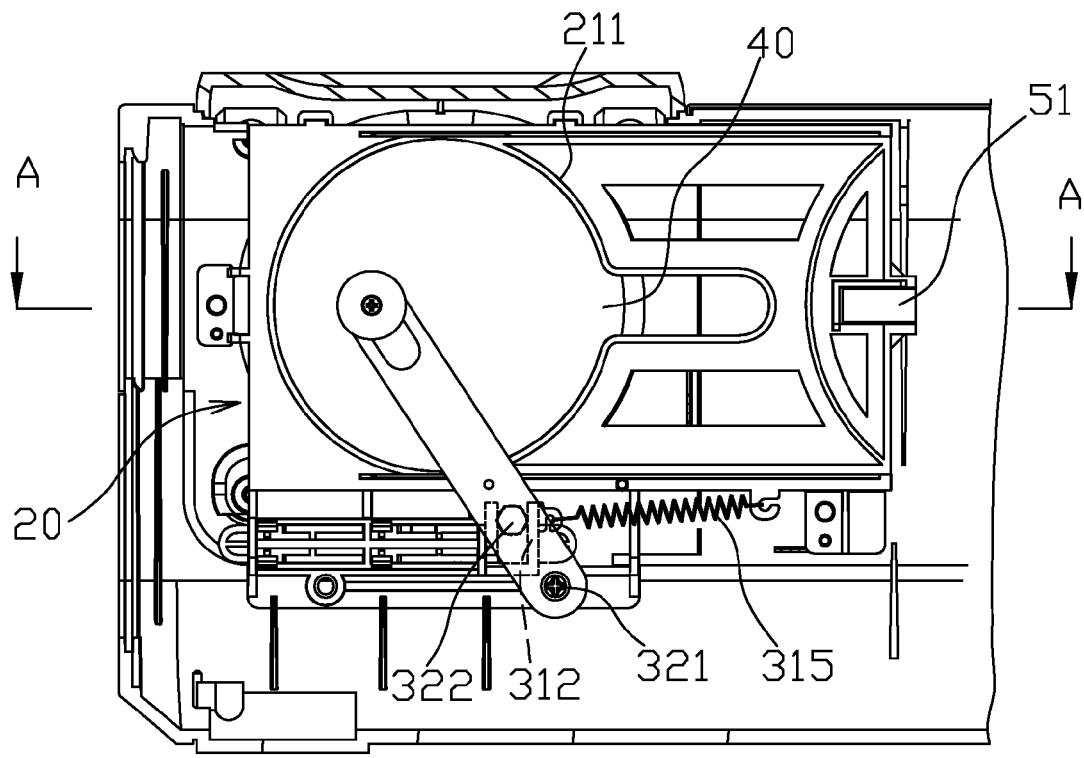
FIG. 5A is a rear diagram showing the closing operation of the lens cap device according to the present invention.
Figure 5B:
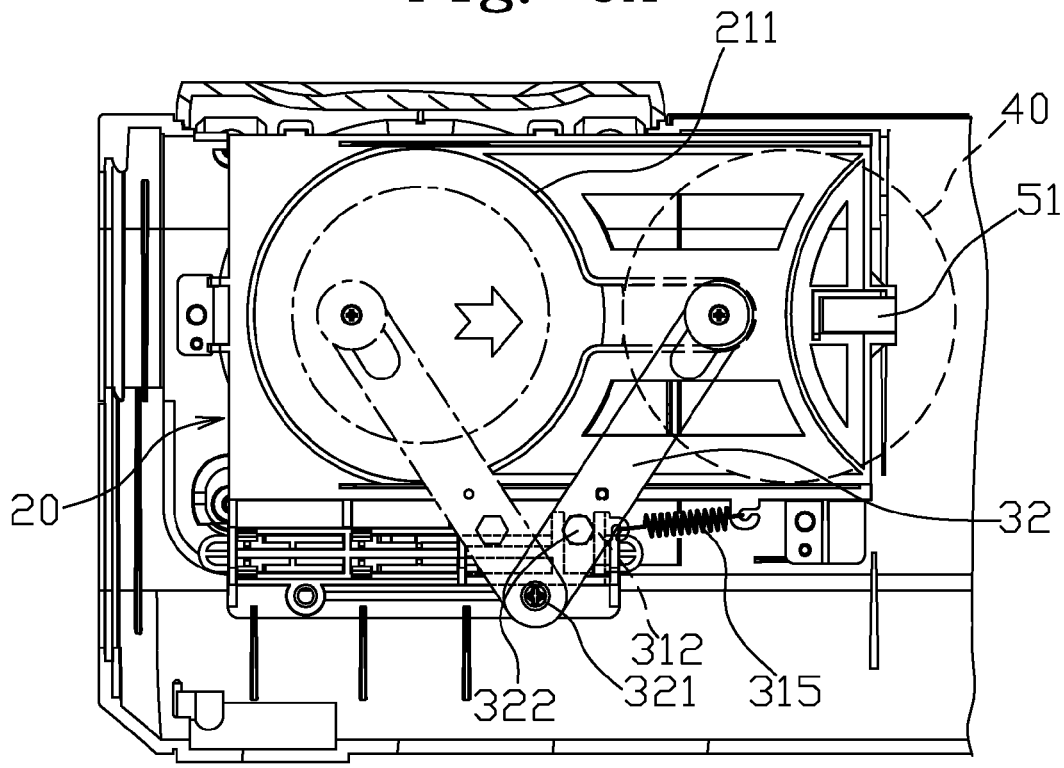
FIG. 5B is a rear diagram showing the opening operation of the lens cap device according to the present invention.
Figure 6A:
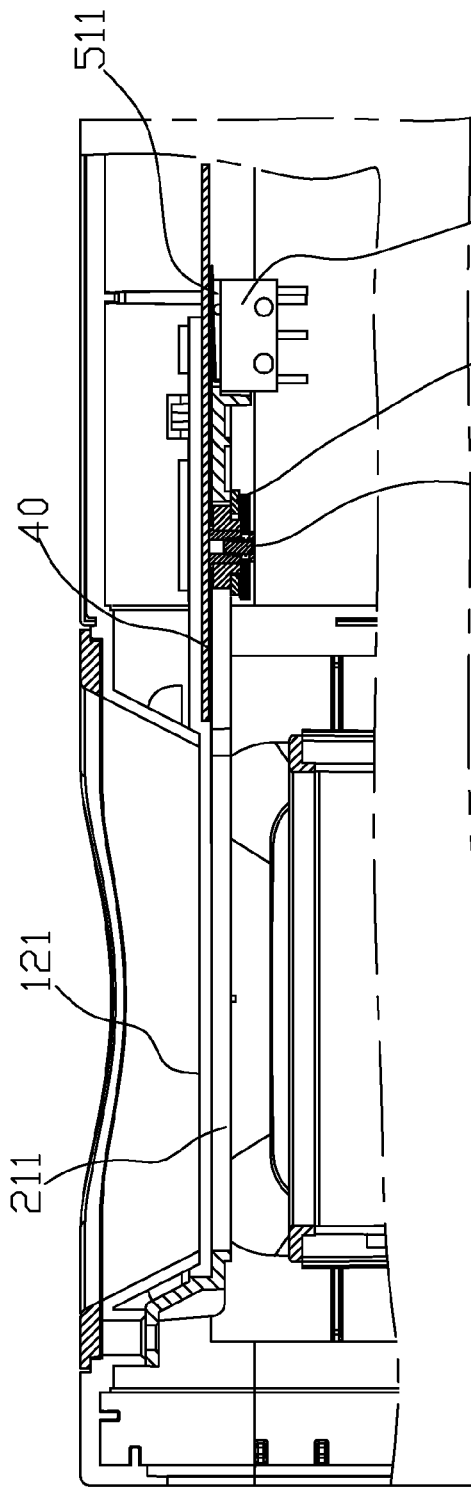
FIG. 6A is a top cross-sectional diagram showing the opening operation of the lens cap device according to the present invention.
Figure 6B:
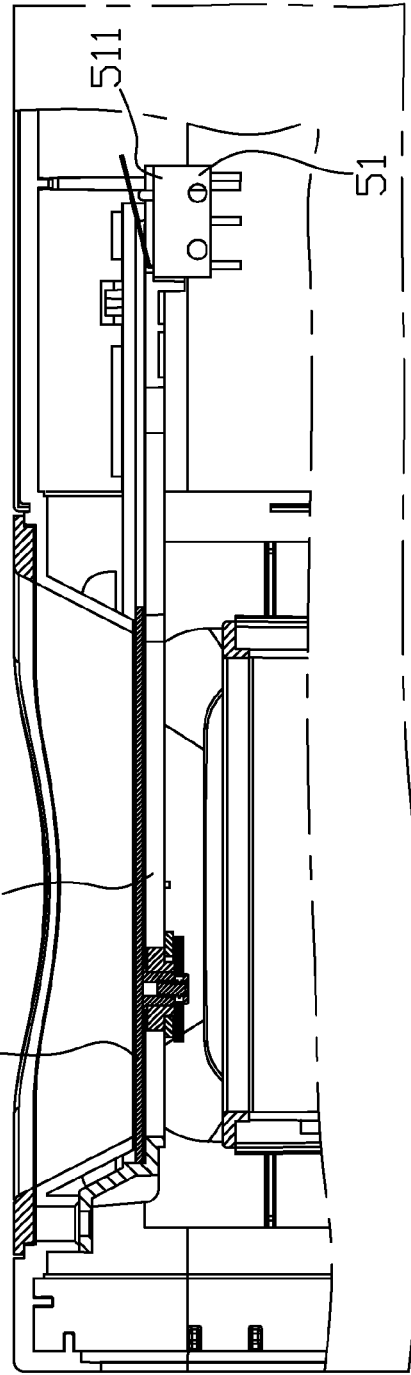
FIG. 6B is a top cross-sectional diagram showing the closing operation of the lens cap device according to the present invention.

As shown in FIG. 4A, when the projector is not in use, the push member 317 can be pushed along the arrow to allow the lens cap 40 to cover the lens hole 121 and the lens exposure hole 211 so as to protect the lens projection 13 in the body device 10. As shown in FIG. 4B, when a user needs to use the projector, the lens cap 40 is open to expose the lens hole 121 (lens exposure hole 211) by pushing the push member 317 along the arrow.

As shown in FIGS. 5A, 5B, 6A and 6B, while pushing the push piece member 317, the push base 312 drives the push rod 322 to actuate the actuating element 32. The actuating element 322 is then swinging about the pivotal-connection position of the pivot hole 321 to drive the lens cap 40 covering (closing) and opening actions to the exposure hole 211.

By the parallel movement of the push member to drive the actuating element in the main body, rotation of the actuating element is generated to open or close the lens cap. The operation is principle includes magnifying the extremely short movement of the push element to activate the longer movement of the lens cap. By incorporating the position sensor, the projector can operated in a safety mode. Moreover, the hidden lens cap dose only provides operation convenience, but also enhances the exterior aesthetic effect of the projector.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A lens cap device, comprising:
   a cap protecting device, having a protecting cap and a lens exposure hole formed through the protecting cap;
   an actuating device, having a push element and an actuating element, wherein said push element is slidably embedded on said cap protecting device, one end of said actuating element is pivotally connected on said cap protecting device to form a pivot, said actuating element is connected to said push element, said push element has a hook loop hooked to an end of a spring, and the other end of said spring is hooked to said protecting cap; and
   a lens cap slidably disposed on said cap protecting device, wherein said lens cap is pivotally connected with the other end of said actuating element opposite to said pivot to form a linkage between said lens cap and said actuating element, and said lens cap is driven by said actuating element to cover or open said lens exposure hole.

2. The lens cap device as claimed in claim 1, wherein said cap protecting device is disposed on a main body which includes a front sidewall having a lens hole aligned with said lens exposure hole, and said cap protecting device is installed within a space between said front sidewall and a projection lens of said main body.

3. The lens cap device as claimed in claim 1, wherein said lens cap is slidably disposed in a slot formed on an inner surface of said protecting cap.

4. The lens cap device as claimed in claim 1, wherein a sensor is mounted to said protecting cap to sense said lens cap.

5. The lens cap device as claimed in claim 4, wherein said sensor is integrated with at least an alarm device.

6. The lens cap device as claimed in claim 1, wherein said cap protecting device further comprises a cap protecting base that is located at said protecting cap, said cap protecting base has at least a locking groove, and said push element has at least one protrusion corresponding to and inserted into said locking groove.

7. The lens cap device as claimed in claim 6, wherein said cap protecting base has a sliding groove, and said push element has a locking protrusion being slidable in said sliding groove.

8. The lens cap device as claimed in claim 7, wherein said sliding groove further has a front snap groove and a rear snap groove for snap positioning.

9. The lens cap device as claimed in claim 1, wherein said push element has a push base capable of linking said actuating element.

10. The lens cap device as claimed in claim 9, wherein a push groove is formed at said push base, said actuating element has a push rod embedded in said push groove and an elliptic pivotal groove, said push rod is closer to said pivot than to said pivotal groove.

* * * * *